US012337441B2

(12) United States Patent
Chen et al.

(10) Patent No.: US 12,337,441 B2
(45) Date of Patent: Jun. 24, 2025

(54) SOCKET STRUCTURE

(71) Applicants: Yi-Fu Chen, Taichung (TW); He-Qian Chen, Taichung (TW)

(72) Inventors: Yi-Fu Chen, Taichung (TW); He-Qian Chen, Taichung (TW)

( * ) Notice: Subject to any disclaimer, the term of this patent is extended or adjusted under 35 U.S.C. 154(b) by 402 days.

(21) Appl. No.: 18/092,945

(22) Filed: Jan. 4, 2023

(65) Prior Publication Data

US 2024/0217070 A1 Jul. 4, 2024

(51) Int. Cl.
*B25B 13/06* (2006.01)

(52) U.S. Cl.
CPC .................................. *B25B 13/065* (2013.01)

(58) Field of Classification Search
CPC ....... B25B 13/06; B25B 13/065; B25B 13/48; B25B 13/481; B25B 23/0035
See application file for complete search history.

(56) References Cited

U.S. PATENT DOCUMENTS 4,126,063 A * 11/1978 Palmer .................. B25B 13/065 81/124.6
4,646,594 A * 3/1987 Tien ...................... B25B 13/065 81/121.1
5,209,144 A * 5/1993 Lu Guoji .................. B25B 7/02 81/135
5,806,383 A * 9/1998 Hsieh ...................... B25B 13/12 81/170
5,832,792 A * 11/1998 Hsieh .................... B25B 13/065 81/124.6
7,168,347 B2 * 1/2007 Hsieh ...................... B25B 27/18 81/120
10,596,685 B2 * 3/2020 Lee ..................... B25B 23/0014
11,426,839 B2 * 8/2022 Lee ....................... B25B 13/065
2008/0295652 A1 * 12/2008 Wu ....................... B25B 13/065 81/186
2016/0288300 A1 * 10/2016 Chen ....................... B25B 13/08
2019/0210196 A1 * 7/2019 Lai .......................... B25B 13/48
2019/0275646 A1 * 9/2019 Liu ....................... B25B 13/065
2020/0324396 A1 * 10/2020 McDowell ............... G10D 9/00

* cited by examiner

*Primary Examiner* — David B. Thomas

(57) ABSTRACT

A socket includes a first section and a second section. The first section is to be connected with a tool. The second section includes an outer face, and a mounting hole is axially defined through the second section and communicates through the first section. The mounting hole includes multiple recesses and multiple sides defined in the inner periphery thereof. The multiple recesses and the multiple sides are located alternatively with each other. Each recess includes a rounded corner formed radially in the inner portion thereof. A triangular groove is formed axially and centrally in each side. The angle between two insides of each groove is smaller than 90 degrees. A rusted or damaged bolt head is engaged with either the rounded corners or the grooves so as to be effectively rotated.

4 Claims, 8 Drawing Sheets

SOCKET STRUCTURE

BACKGROUND OF THE INVENTION

1. Fields of the Invention

The present invention relates to a socket.

2. Descriptions of Related Art

Bolts are used to connect two parts and some of the bolts need to be disassembled, repaired or replaced after many years of use. The bolts may be rusted or damaged due to various external factors. The damaged or rusted bolts cannot be easily unscrewed and removed from the machine by using conventional hand tools. On the other hand, the rusted or damaged bolts can be easily deformed when being clamped and rotated.

In order to effectively rotating the bolts or the like, various air-powered or electric-powered tools are invented and wildly used. This kind of tools are very effective to lock or unlock screws and bolts, which can greatly reduce the time-consuming and labor-intensive consumption of manpower.

The air-powered or electric-powered tools are usually connected with a socket which is mounted to a bolt and then rotates the bolt at high efficiency. However, for the rusted or damaged bolts, the socket cannot properly mounted to the head of the bolt so that the socket is rotated independently relative to the bolt.

The present invention intends to provide a socket that includes multiple recesses and sides formed to the mounting hole to eliminate the shortcomings mentioned above.

SUMMARY OF THE INVENTION

The present invention relates to a socket and includes a first section and a second section that is formed to the first section. The first section is to be connected with a tool. The second section includes an outer face, and a mounting hole is axially defined through the second section and communicates through the first section. The mounting hole includes multiple recesses and multiple sides defined in the inner periphery thereof. The multiple recesses and the multiple sides are located alternatively with each other. Each recess includes a rounded corner formed radially in the inner portion thereof. A triangular groove is formed axially and centrally in each side. The angle between two insides of each groove is smaller than 90 degrees. A rusted or damaged bolt head is engaged with either the rounded corners or the grooves so as to be effectively rotated.

The rounded corners of the recesses are able to be engaged with a normal bolt head or a damaged blot head. The curvature of the rounded corners allow the corners of the bolt head to be accommodated in the rounded corners such that the bolt head can be rotated by the socket. The grooves of the socket are able to be engaged the corners of a severely damaged bolt head so as to rotate the severely damaged bolt head.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
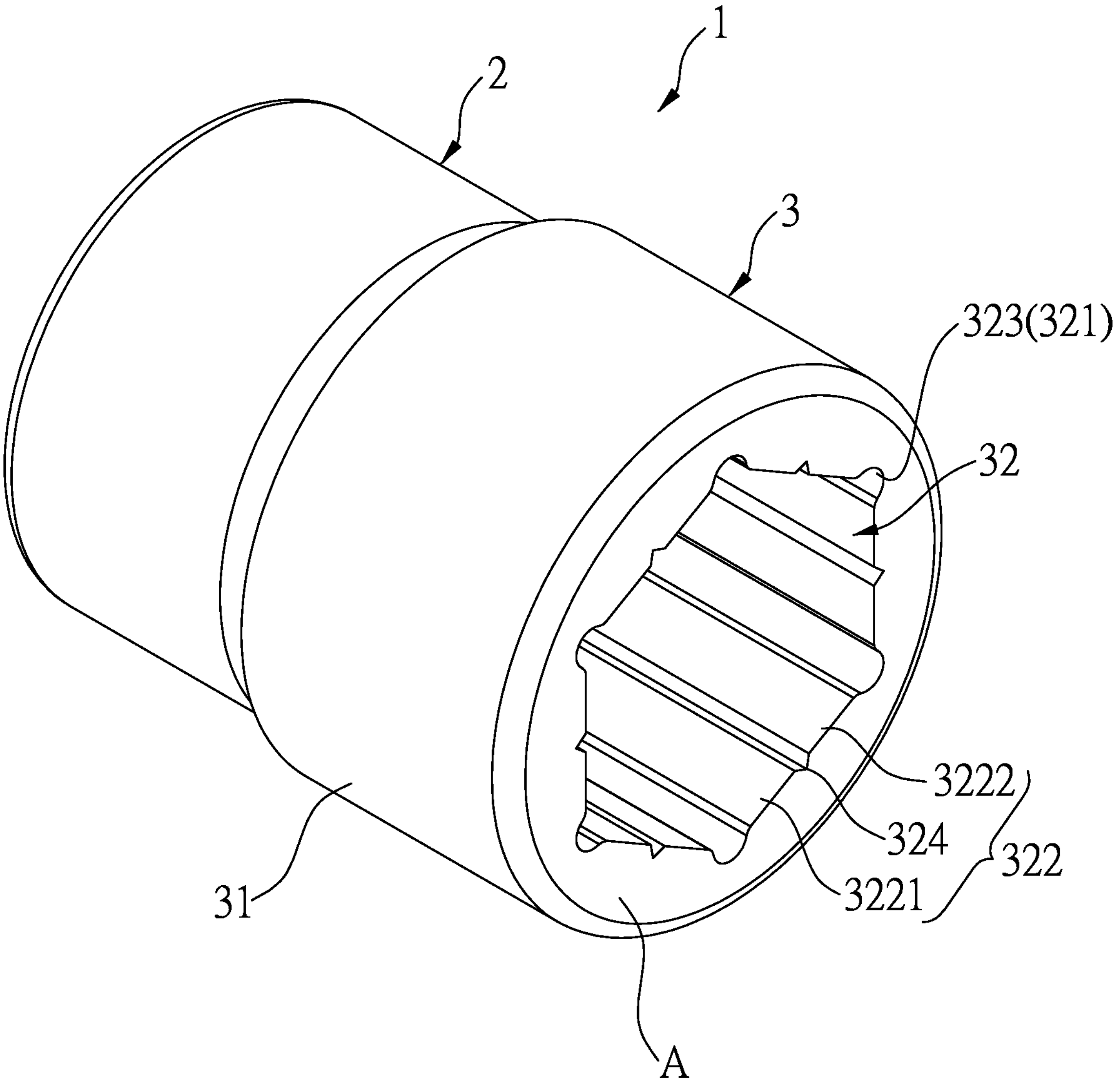
FIG. 1 is a perspective view to show the socket of the present invention.
Figure 2:
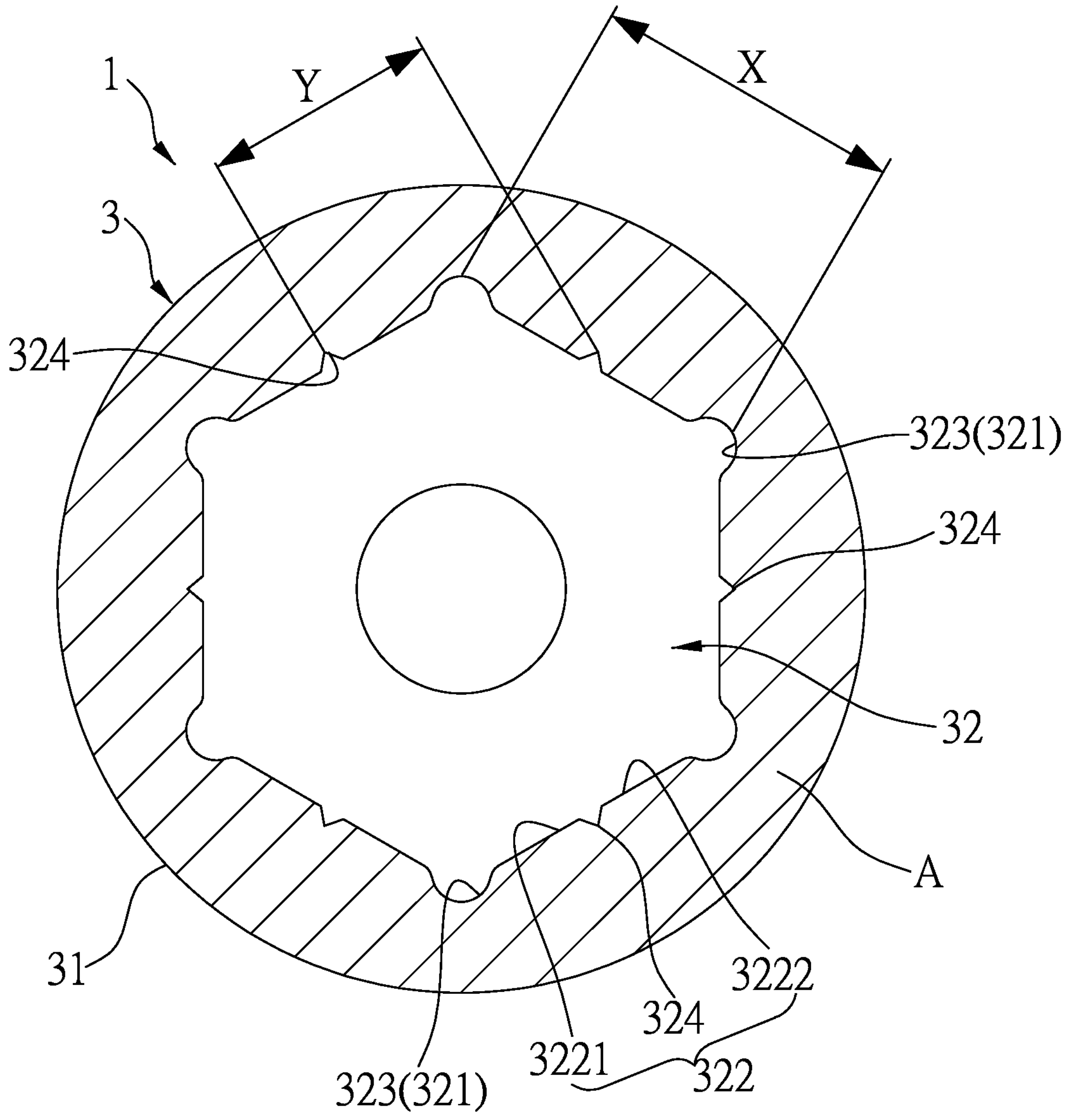
FIG. 2 is an end view of the socket of the present invention.
Figure 3:
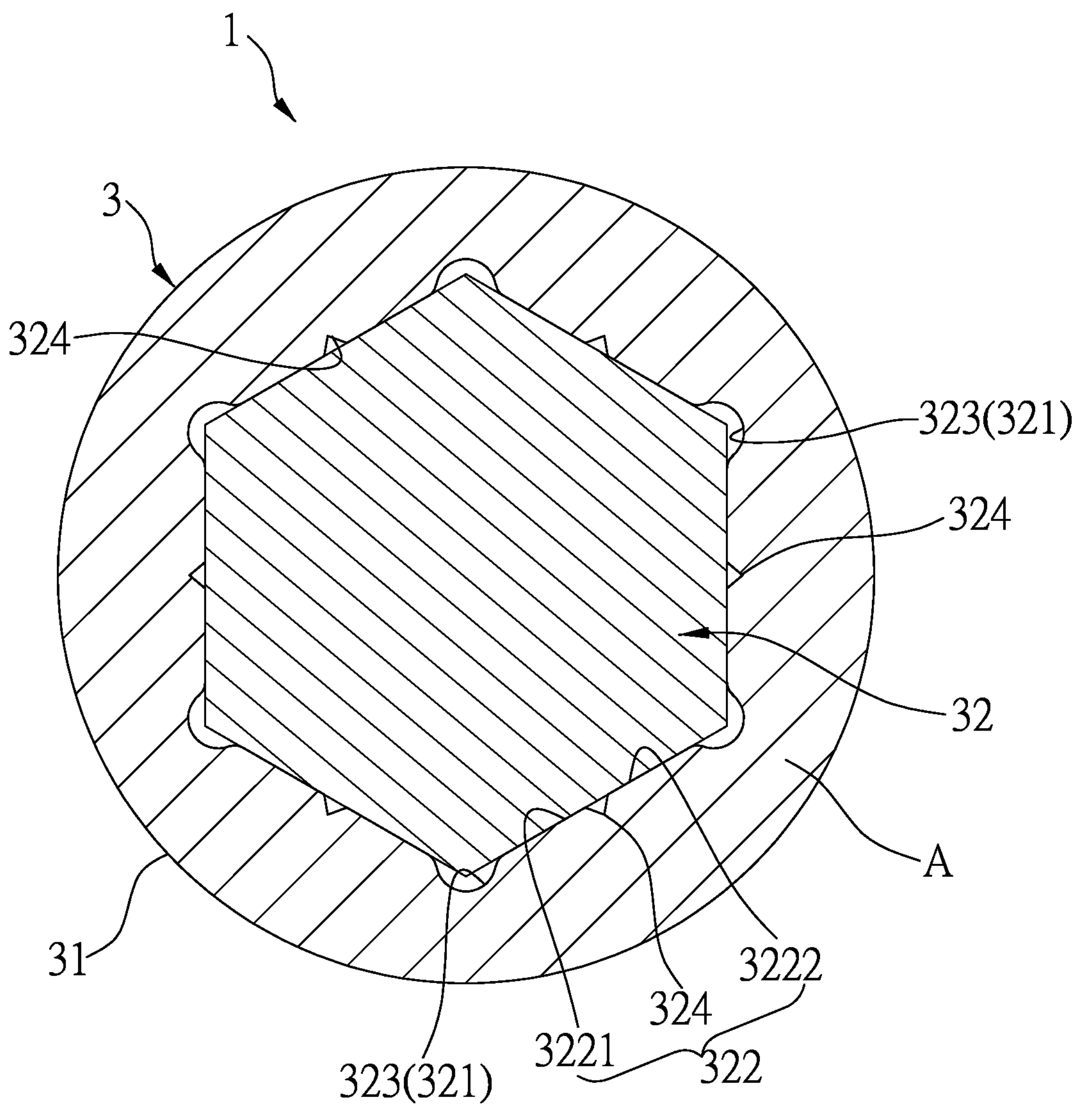
FIG. 3 shows a normal bolt head is engaged with the mounting hole of the socket of the present invention.

Referring to FIGS. 1 to 3, the socket 1 of the present invention comprises a first section 2 and a second section 3 which is integrally formed with the first section 2. The first section 2 is to be connected with a tool which is not shown in the drawings.

The second section 3 includes an outer face 31, and a mounting hole 32 is axially defined through the second section 3 and communicates through the first section 2. The mounting hole 32 is smaller than the diameter of the outer face 31 of the second section 3. As shown in FIG. 2, the mounting hole 32 is defined in the end face "A" of the second section 3. Multiple recesses 321 and multiple sides 322 are defined in the inner periphery of the mounting hole 32. The multiple recesses 321 and the multiple sides 322 are located alternatively with each other. Each recess 321 includes a rounded corner 323 formed radially in the inner portion thereof. The rounded corners 323 do not communicate with the outer face 31. A groove 324 is formed axially and centrally in each side 322, and is a triangular groove. The angle between two insides of each groove 324 is smaller than 90 degrees so as to be engaged with corners of a damaged bolt head 32. As shown in FIGS. 1-7, the groove 324 is located at the center of each side 322 so that each side 322 is divided into a first subside 3221 and a second subside 3222 by the groove 324. That is to say, the groove 324 is located between the first subside 3221 and the second subside 3222. The first subside 3221 and the second subside 3222 respectively communicate with the recess 321 corresponding thereto. The first subside 3221 and the second subside 3222 are used to be in contact with six sides of the bolt head 32.

Each of the first subside 3221 and the second subside 3222 of each side 322 is a straight side. The first subside 3221 and the second subside 3222 of each side 322 are parallel to each other.

In addition, the curvature of the rounded corner 323 of each recess 321 is larger than Ω/2 so as to be engaged with the corners of a smaller and damaged bolt head 32.

As shown in FIG. 2, the distance "X" between two adjacent rounded corners 323 is larger than the distance "Y" between two adjacent grooves 324. The specific arrangement is to ensure that when a severely damaged bolt head 32 is to be mounted in the mounting hole 32, and the corners of the severely damaged bolt head 32 cannot be engaged with the rounded corners 323, the grooves 324 may directly or indirectly hold the severely damaged bolt head 32.

Figure 4:
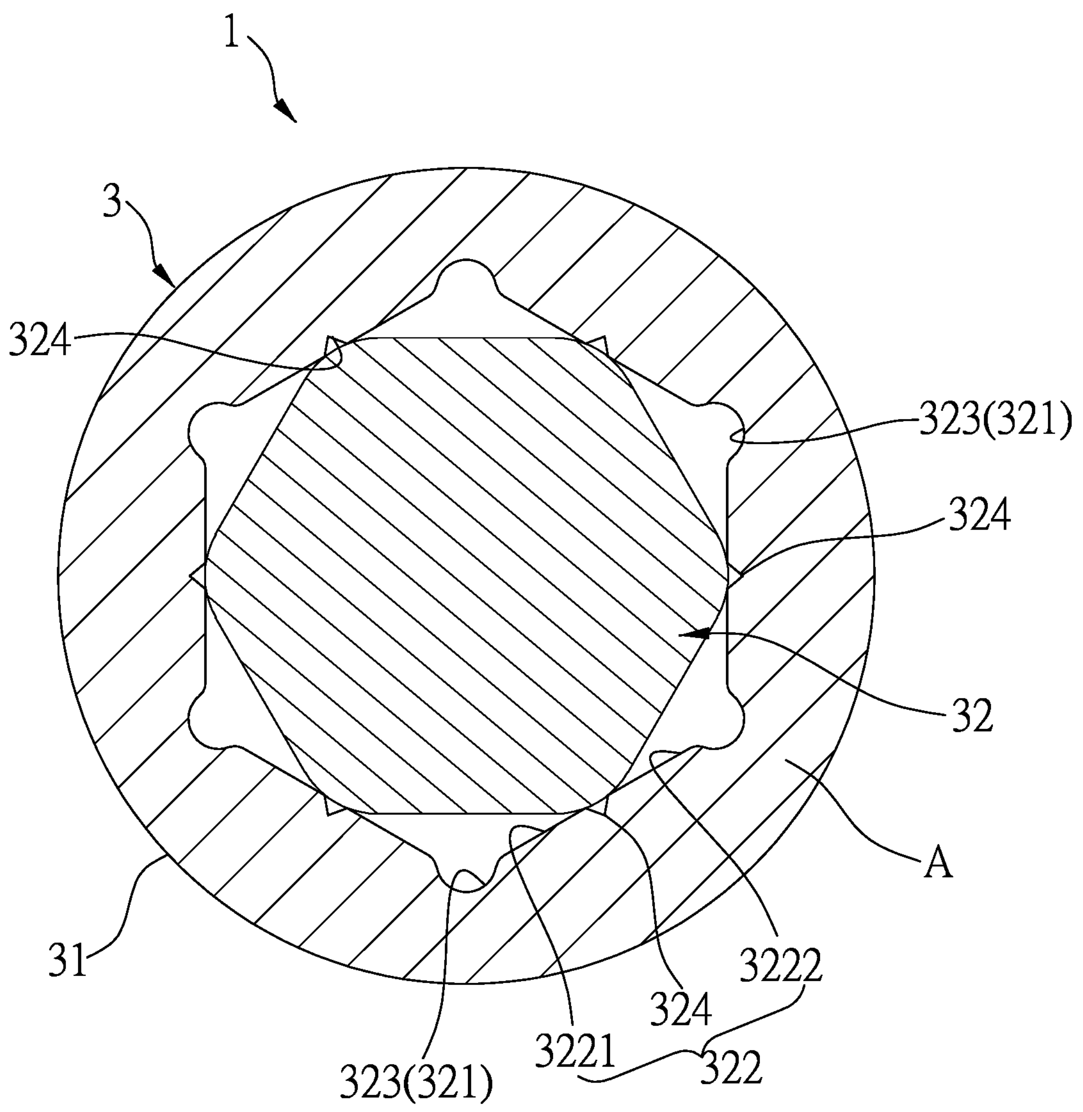
FIG. 4 shows another status of a normal bolt head engaged with the mounting hole of the socket of the present invention.
Figure 5:
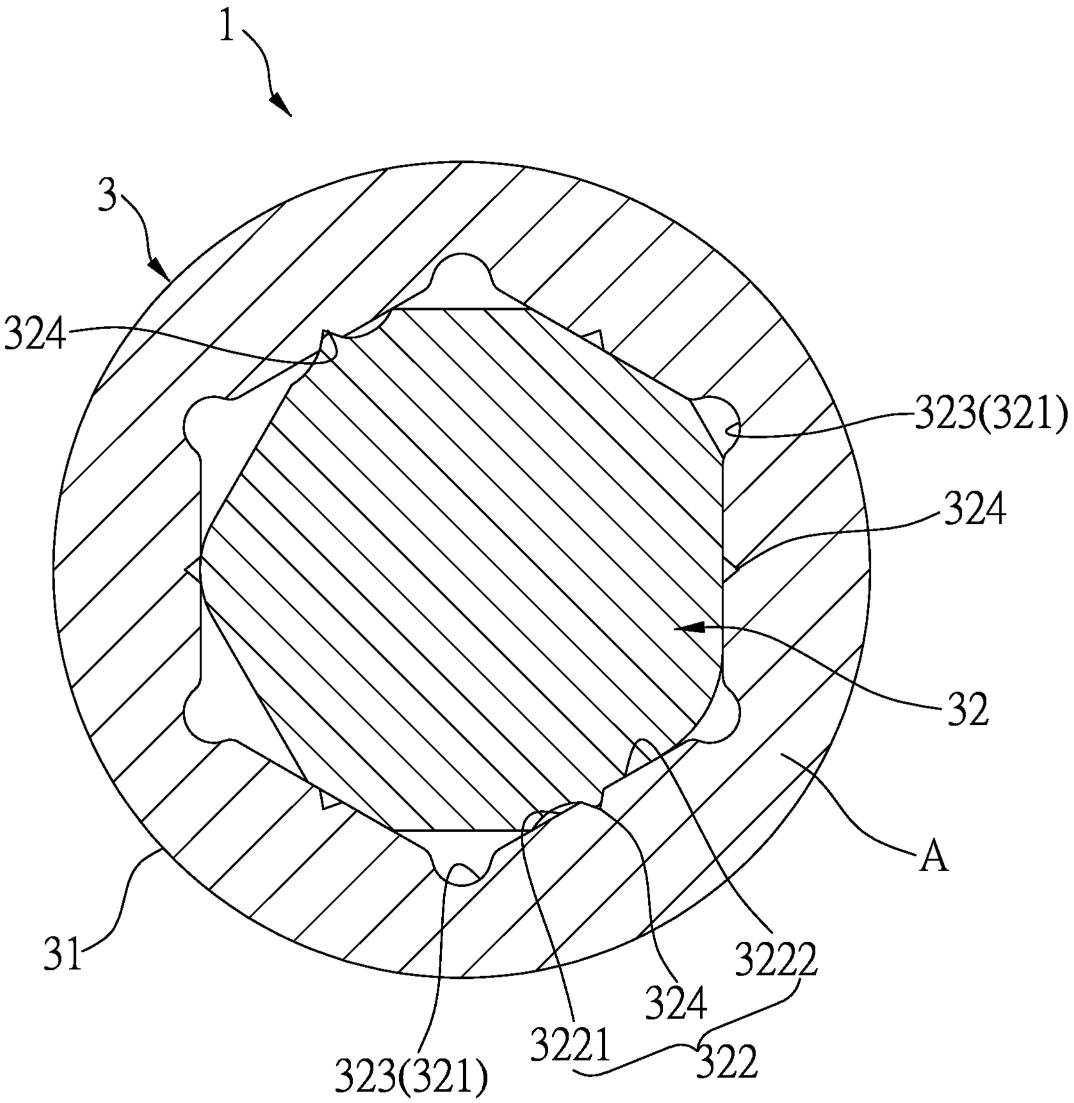
FIGS. 5 to 7 respectively show a damaged bolt head is engaged with the mounting hole of the socket of the present invention.
Figure 6:
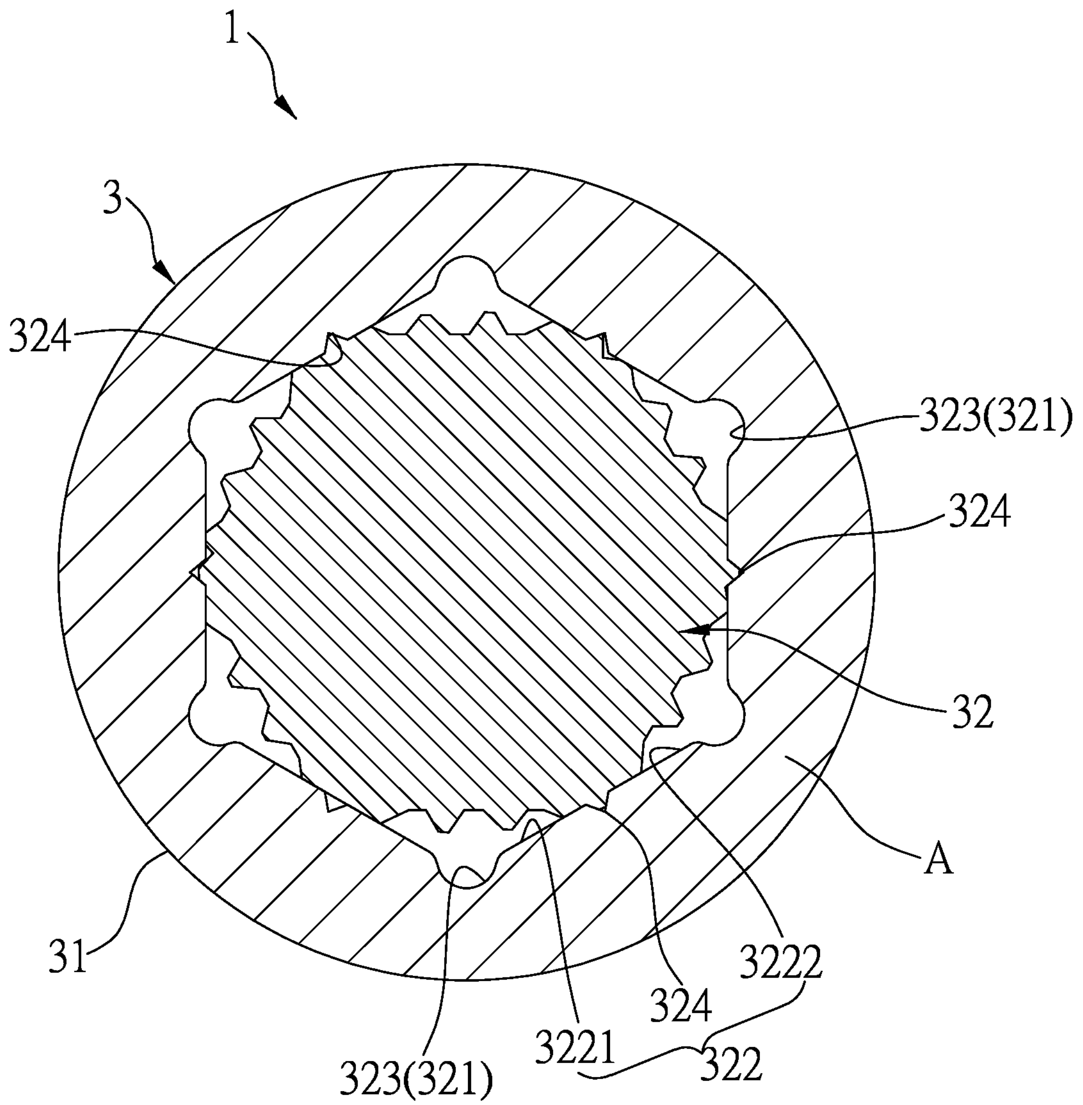
Figure 7:
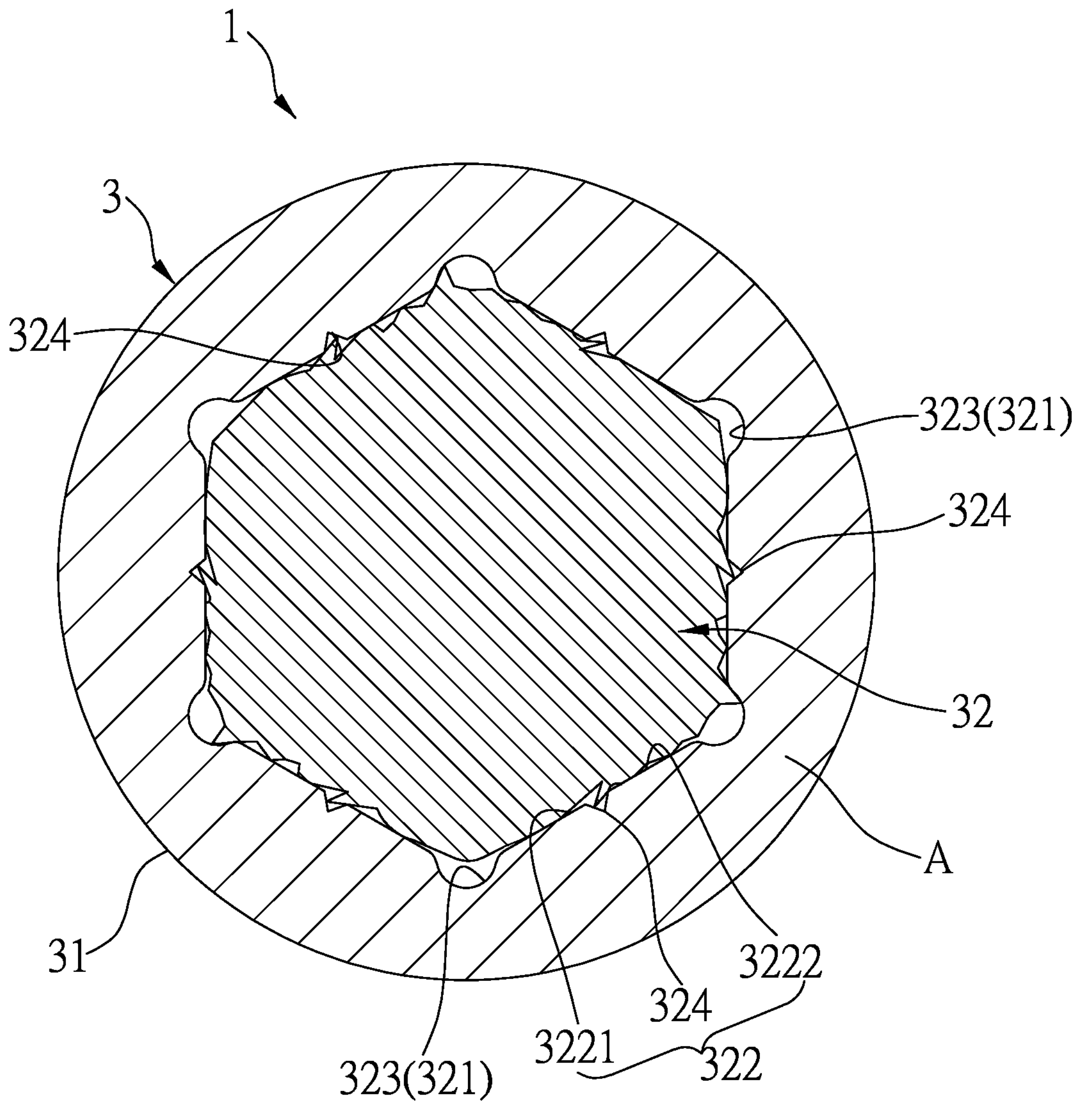

FIGS. 3 and 4 show that a normal bolt head 32 is engaged with the mounting hole 32 of the socket 1. FIGS. 5-7 show that some of the sides of a damaged bolt head 32 are engaged with at least one of the grooves 324 and/or at least one of the rounded corners 323, such that the severely damaged bolt head 32 can be rotated.

Figure 8:
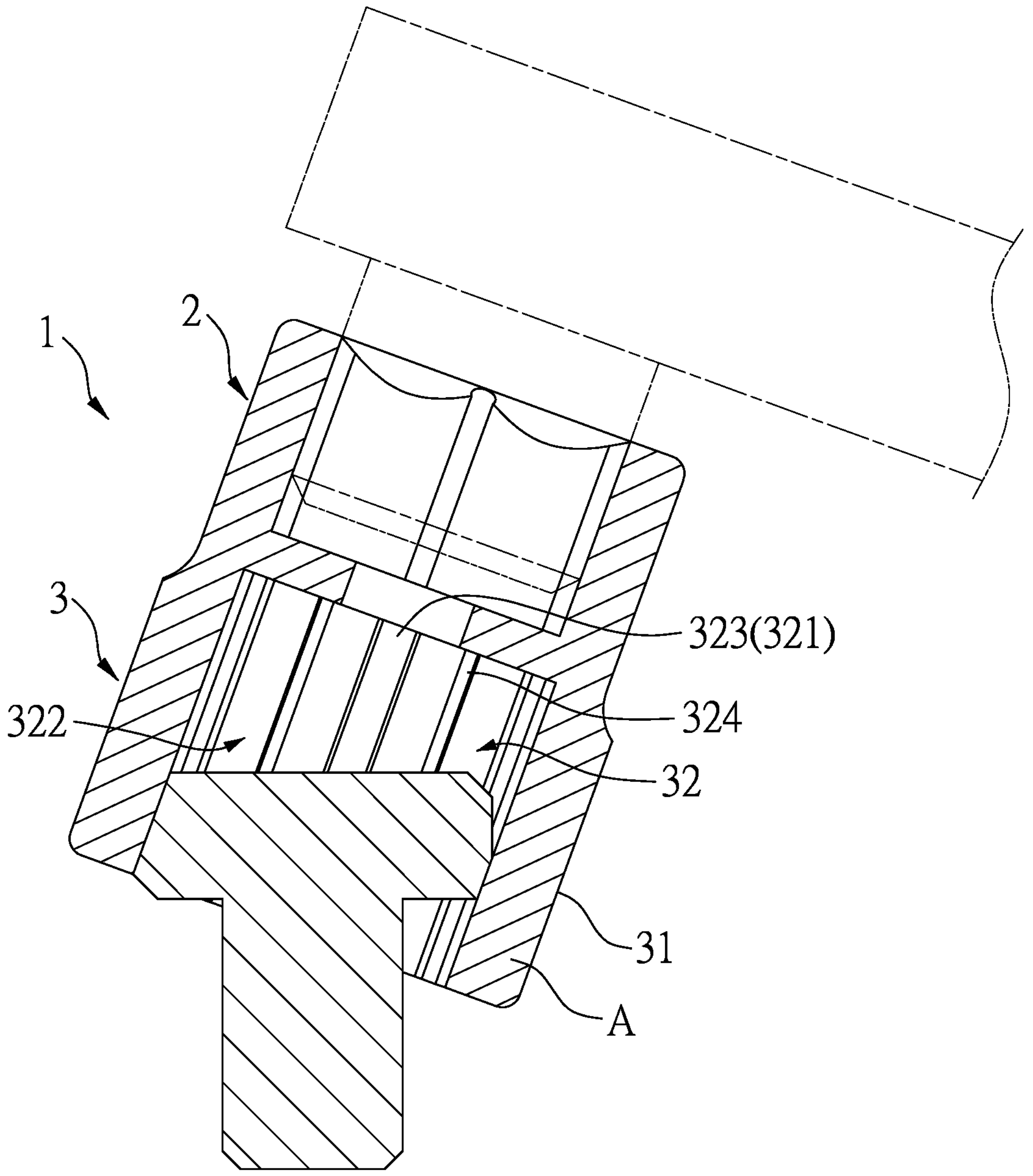
FIG. 8 shows that a blot head is engaged with the mounting hole of the socket of the present invention at an angle.

As shown in FIG. 8, a blot head 32 can be engaged with the mounting hole 32 of the socket 1 of the present invention at an angle.

While we have shown and described the embodiment in accordance with the present invention, it should be clear to those skilled in the art that further embodiments may be made without departing from the scope of the present invention.

What is claimed is:

1. A socket comprising:

a first section and a second section which is formed with the first section;

the second section including an outer face, a mounting hole axially defined through the second section and communicating through the first section, the mounting hole being smaller than a diameter of the outer face of the second section, multiple recesses and multiple sides defined in an inner periphery of the mounting hole, the multiple recesses and the multiple sides being located alternatively with each other, each recess including a rounded corner formed radially in an inner portion thereof, a groove formed axially and centrally in each side and being a triangular groove, an angle between two insides of each groove being smaller than 90 degrees, and each of the sides of the mounting hole including a first subside and a second subside, the groove located between the first subside and the second subside, the first subside and the second subside respectively communicating with the recess corresponding thereto, each of the first subside and the second subside of each side being a straight side.

2. The socket as claimed in claim 1, wherein a distance between two adjacent rounded corners is larger than a distance between two adjacent grooves.

3. A socket comprising:

a first section and a second section which is formed with the first section;

the second section including an outer face, a mounting hole axially defined through the second section and communicating through the first section, the mounting hole being smaller than a diameter of the outer face of the second section, multiple recesses and multiple sides defined in an inner periphery of the mounting hole, the multiple recesses and the multiple sides being located alternatively with each other, each recess including a rounded corner formed radially in an inner portion thereof, a groove formed axially and centrally in each side and being a triangular groove, an angle between two insides of each groove being smaller than 90 degrees, and each of the sides of the mounting hole including a first subside and a second subside, the groove located between the first subside and the second subside, the first subside and the second subside respectively communicating with the recess corresponding thereto, the first subside and the second subside of each side being parallel to each other.

4. The socket as claimed in claim 3, wherein a distance between two adjacent rounded corners is larger than a distance between two adjacent grooves.

* * * * *